(12) United States Patent
Vilc et al.

(10) Patent No.: US 9,224,541 B2
(45) Date of Patent: *Dec. 29, 2015

(54) SOLID ELECTROLYTIC CAPACITOR FOR USE IN HIGH VOLTAGE AND HIGH TEMPERATURE APPLICATIONS

(71) Applicant: AVX Corporation, Fountain Inn, SC (US)

(72) Inventors: Ladislav Vilc, Lanskroun (CZ); Martin Biler, Lanskroun (CZ); Stanislav Zednicek, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,417

(22) Filed: Sep. 2, 2014

(65) Prior Publication Data

US 2014/0368974 A1   Dec. 18, 2014

Related U.S. Application Data

(63) Continuation of application No. 12/916,802, filed on Nov. 1, 2010, now Pat. No. 8,824,122.

(51) Int. Cl.
*H01G 9/00* (2006.01)
*H01G 9/10* (2006.01)
(Continued)

(52) U.S. Cl.
CPC . *H01G 9/10* (2013.01); *H01G 2/10* (2013.01); *H01G 9/0032* (2013.01); *H01G 9/028* (2013.01);
(Continued)

(58) Field of Classification Search
CPC ............ H01G 9/025; H01G 9/08; H01G 9/15
See application file for complete search history.

(56) References Cited

U.S. PATENT DOCUMENTS

| 3,345,545 A | 10/1967 | Bourgault et al. |
| 3,440,495 A | 4/1969 | Howard et al. |

(Continued)

FOREIGN PATENT DOCUMENTS

| GB | 1069685 | 8/1965 |
| JP | 3127813 | 5/1991 |

(Continued)

OTHER PUBLICATIONS

Abstract of Japanese Patent No. JP1140621 dated Jun. 1, 1989.

(Continued)

*Primary Examiner* — Dion R Ferguson
(74) *Attorney, Agent, or Firm* — Dority & Manning, P.A.

(57) ABSTRACT

A capacitor assembly for use in high voltage and high temperature environments is provided. More particularly, the capacitor assembly includes a solid electrolytic capacitor element containing an anode body, a dielectric overlying the anode, and a solid electrolyte overlying the dielectric. To help facilitate the use of the capacitor assembly in high voltage applications, it is generally desired that the solid electrolyte is formed from a dispersion of preformed conductive polymer particles. In this manner, the electrolyte may remain generally free of high energy radicals (e.g., $Fe^{2+}$ or $Fe^{3+}$ ions) that can lead to dielectric degradation, particularly at relatively high voltages (e.g., above about 60 volts). Furthermore, to help protect the stability of the solid electrolyte at high temperatures, the capacitor element is enclosed and hermetically sealed within a housing in the presence of a gaseous atmosphere that contains an inert gas.

20 Claims, 4 Drawing Sheets (51) Int. Cl.

| | |
|---|---|
| *H01G 2/10* | (2006.01) |
| *H01G 9/028* | (2006.01) |
| *H01G 9/08* | (2006.01) |
| *H01G 9/15* | (2006.01) |
| *H01G 11/48* | (2013.01) |
| *H01G 11/56* | (2013.01) |
| *H01G 9/042* | (2006.01) |
| *H01G 9/052* | (2006.01) |

(52) U.S. Cl.
CPC ............... *H01G 9/042* (2013.01); *H01G 9/052* (2013.01); *H01G 9/08* (2013.01); *H01G 9/15* (2013.01); *H01G 11/48* (2013.01); *H01G 11/56* (2013.01); *Y02E 60/13* (2013.01); *Y10T 29/417* (2015.01)

(56) References Cited

U.S. PATENT DOCUMENTS

| | | | |
|---|---|---|---|
| 3,611,055 A | 10/1971 | Zeppieri et al. |
| 3,922,773 A | 12/1975 | Marien et al. |
| 4,085,435 A | 4/1978 | Galvagni |
| 4,479,168 A | 10/1984 | Green, Jr. |
| 4,508,563 A | 4/1985 | Bernard et al. |
| 4,755,908 A | 7/1988 | Gardner |
| 4,910,645 A | 3/1990 | Jonas et al. |
| 4,945,452 A | 7/1990 | Sturmer et al. |
| 4,959,430 A | 9/1990 | Jonas et al. |
| 5,111,327 A | 5/1992 | Blohm et al. |
| 5,198,968 A | 3/1993 | Galvagni |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,586,000 A | 12/1996 | Sakata et al. |
| 5,608,261 A | 3/1997 | Bhattacharyya et al. |
| 5,638,253 A | 6/1997 | Hasegawa |
| 5,694,287 A | 12/1997 | Nishiyama et al. |
| 5,729,428 A | 3/1998 | Sakata et al. |
| 5,812,367 A | 9/1998 | Kudoh et al. |
| 5,949,639 A | 9/1999 | Maeda et al. |
| 5,951,840 A | 9/1999 | Fukaumi et al. |
| 6,052,273 A | 4/2000 | Inoue et al. |
| 6,191,936 B1 | 2/2001 | Webber et al. |
| 6,197,252 B1 | 3/2001 | Bishop et al. |
| 6,322,912 B1 | 11/2001 | Fife |
| 6,369,239 B2 | 4/2002 | Rauchschwalbe et al. |
| 6,391,275 B1 | 5/2002 | Fife |
| 6,416,730 B1 | 7/2002 | Fife |
| 6,447,570 B1 | 9/2002 | Pozdeev-Freeman |
| 6,527,937 B2 | 3/2003 | Fife |
| 6,528,662 B2 | 3/2003 | Jonas |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,756,473 B2 | 6/2004 | Reuter et al. |
| 6,891,016 B2 | 5/2005 | Reuter et al. |
| 6,987,663 B2 | 1/2006 | Merker et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,262,511 B2 | 8/2007 | Osako et al. |
| 7,279,015 B2 | 10/2007 | Merker |
| 7,304,832 B2 | 12/2007 | Ushio et al. |
| 7,312,979 B2 | 12/2007 | Ishizuka et al. |
| 7,341,705 B2 | 3/2008 | Schnitter |
| 7,341,801 B2 | 3/2008 | Reuter et al. |
| 7,358,326 B2 | 4/2008 | Heuer et al. |
| 7,365,962 B2 | 4/2008 | Miura et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,449,588 B2 | 11/2008 | Jonas et al. |
| 7,515,396 B2 | 4/2009 | Biler |
| 7,554,793 B2 | 6/2009 | Chacko |
| 7,563,290 B2 | 7/2009 | Qiu et al. |
| 7,582,958 B2 | 9/2009 | Brailey |
| 7,585,983 B2 | 9/2009 | Reuter et al. |
| 7,679,885 B2 | 3/2010 | Mizusaki et al. |
| 7,688,571 B2 | 3/2010 | Ishizuka et al. |
| 7,697,265 B2 | 4/2010 | Umemoto et al. |
| 7,750,099 B2 | 7/2010 | Chikusa et al. |
| 7,785,493 B2 | 8/2010 | Jonas et al. |
| 8,194,395 B2 | 6/2012 | Zednicek et al. |
| 8,259,436 B2 | 9/2012 | Petrzilek et al. |
| 8,279,584 B2 | 10/2012 | Zednickova |
| 8,576,544 B2 | 11/2013 | Rawal et al. |
| 2001/0012193 A1 | 8/2001 | Watanabe et al. |
| 2005/0065352 A1 | 3/2005 | Brassat et al. |
| 2005/0167789 A1 | 8/2005 | Zhuang |
| 2006/0035143 A1 | 2/2006 | Kida et al. |
| 2006/0180797 A1 | 8/2006 | Merker et al. |
| 2006/0260713 A1 | 11/2006 | Pyszczek et al. |
| 2007/0064376 A1 | 3/2007 | Merker et al. |
| 2008/0005878 A1 | 1/2008 | Merker et al. |
| 2009/0030149 A1 | 1/2009 | Morita et al. |
| 2009/0244812 A1 | 10/2009 | Rawal et al. |
| 2009/0310285 A1 | 12/2009 | Reuter et al. |
| 2009/0318710 A1 | 12/2009 | Brassat et al. |
| 2010/0148124 A1 | 6/2010 | Reuter et al. |
| 2010/0265634 A1 | 10/2010 | Freeman et al. |

FOREIGN PATENT DOCUMENTS

| | | |
|---|---|---|
| JP | 11112157 | 4/1999 |
| JP | 2005217129 | 8/2005 |
| JP | 2006278875 | 10/2006 |
| WO | WO 2008003938 | 1/2008 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Machine Translation of JP2005217129.
Machine Translation of JP2006278875.
Machine Translation of Japanese Patent No. 2005-039168 (Oct. 2, 2005), 17 pages.
Article—Freeman et al, "Stable, Reliable, and Efficient Tantalum Capacitors," *CARTS USA 2008*, 28th Symposium for Passive Electronics, Mar. 2008, Newport Beach, California. 6 pages.
Article—Freeman et al., "Electrical Characterization of Polymer Tantalum Capacitors with Poly(3,4-ethylenedioxythlophene) Cathode," *CARTS Europe 2008*, Oct. 20-23, 2008, in Helsinki, Finland, 9 pages.
Article—Freeman et al., "Reliability and Critical Applications of Tantalum Capacitors," *CARTS Europe 2007*, Oct.-Nov. 2007, Barcelona, Spain, pp. 193-204.
Article—Simkins et al., "Tantalum Powders for High Voltage Applications II," *CARTS 2004*, 24th Annual Capacitor and Resistor Technology Symposium, Mar. 29, Apr. 1, 2004, pp. 47-54.
Paper—Merker et al., "Conducting Polymer Dispersions for High-Capacitance Tantalum Capacitors,": CARTS Europe 2006, Sep. 2006, Bad Homburg, Germany, 6 pages.

(56) References Cited

OTHER PUBLICATIONS

Paper—Merker et al., "New Conducting Polymer Dispersions for Solid Electrolytic Capacitors." CARTS Europe 2005, Oct. 17-20, 2005, Prague, CZ Republic, 6 pages.

Paper—Merker et al., "Tuning Conducting Polymer Dispersions for High-CV Tantalum Capacitors," CARTS Europe Oct. 29-Nov. 1, 2007, Barcelona, Spain, 6 pages.

Paper—Simpson et al., "Advances and Applications of Inherently Conductive Polymer Technologies Based on Poly(3,4-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.

Paper —Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.

Presentation—Freeman et al., "Hermetically Sealed Polymer Tantalum Capacitors," CMSE Europe 2010.

Abstract of Japanese Patent—JP2000357638, Dec. 26, 2000, 2 pages.

Abstract of Japanese Patent—JPH11003840 dated Jan. 6; 1999, 1 page.

FIG. 5

SOLID ELECTROLYTIC CAPACITOR FOR USE IN HIGH VOLTAGE AND HIGH TEMPERATURE APPLICATIONS

RELATED APPLICATION

The present application is a continuation of U.S. application Ser. No. 12/916,802, filed on Nov. 1, 2010, which is incorporated herein in its entirety by reference thereto.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al. Unfortunately, however, the stability of such solid electrolytes is poor at high temperatures due to the tendency to transform from a doped to an un-doped state, or vice versa. As such, a need currently exists for a solid electrolytic capacitor having improved performance in high temperature environments.

SUMMARY OF THE INVENTION

In accordance with one embodiment of the present invention, a capacitor assembly is disclosed that comprises a capacitor element comprising an anode formed from an anodically oxidized, sintered porous body and a solid electrolyte overlying the anode. The solid electrolyte is formed from a dispersion of conductive polymer particles. The assembly also comprises a housing that defines an interior space within which the capacitor element is positioned, wherein the housing defines an interior space that has a gaseous atmosphere that contains an inert gas. An anode termination is in electrical connection with the anode body and a cathode termination that is in electrical connection with the solid electrolyte.

In accordance with another embodiment of the present invention, a method of forming a capacitor assembly is disclosed that comprises forming a capacitor element by a method that comprises anodically oxidizing a sintered porous body to form an anode and applying a dispersion of conductive polymer particles to the anode to form a solid electrolyte; positioning the capacitor element within an interior space of the housing; electrically connecting the anode of the capacitor element to an anode termination and the solid electrolyte of the capacitor element to a cathode termination; and hermetically sealing the capacitor element within the housing in the presence of a gaseous atmosphere that contains an inert gas.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly for use in high voltage and high temperature environments. More particularly, the capacitor assembly includes a solid electrolytic capacitor element containing an anode body, a dielectric overlying the anode, and a solid electrolyte overlying the dielectric. To help facilitate the use of the capacitor assembly in high voltage applications, it is generally desired that the solid electrolyte is formed from a dispersion of preformed conductive polymer particles. In this manner, the electrolyte may remain generally free of high energy radicals (e.g., $Fe^{2+}$ or $Fe^{3+}$ ions) that can lead to dielectric degradation, particularly at relatively high voltages (e.g., above about 60 volts). Furthermore, to help protect the stability of the solid electrolyte at high temperatures, the capacitor element is enclosed and hermetically sealed within a housing in the presence of a gaseous atmosphere that contains an inert gas. It is believed that the housing and inert gas atmosphere are capable of limiting the amount of oxygen and moisture supplied to the conductive polymer of the capacitor. In this manner, the solid electrolyte is less likely to undergo a reaction in high temperature environments, thus increasing the thermal stability of the capacitor assembly. In addition to functioning well in both high voltage and high temperature environments, the capacitor assembly of the present invention may also exhibit a high volumetric efficiency.

Various embodiments of the present invention will now be described in more detail.

I. Capacitor Element

To help achieve the desired volumetric efficiency, the capacitor element may be formed in a manner so that it occupies a substantial portion of the volume of the interior space of the housing, such as about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior space of the housing. The ability to employ a capacitor element that has a size large enough to occupy a substantial portion of the interior of a housing, such as described above, may be facilitated by optimizing the dimensional stability of the anode. More specifically, selective control over the materials and method from which the anode is made can allow it to remain dimensionally stable even after sintering. For example, the anode contains a porous body formed from a valve metal powder. The specific charge of the powder may vary, such as from about 2,000 µF*V/g to about 80,000 µF*V/g, in some embodiments from about 5,000 µF*V/g to about 40,000 µF*V/g or more, and in some embodiments, from about 10,000 to about 20,000 µF*V/g. The valve metal powder contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The particles of the powder may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

Other components may be added to the powder to facilitate the construction of the anode body. For example, a binder and/or lubricant may be employed to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al.

Once formed, the anode body is then sintered. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Due to the specific charge of the powder used to form the anode body, sintering can sometimes result in a substantial degree of shrinkage. As the size of the anode body increases, this shrinkage can cause a fairly significant degree of bending in the anode structure. Without intending to be limited by theory, it is believed that bending is increased when the anode body is in physical contact with external hard surface(s) (e.g., surface of a sinter tray). More specifically, such hard surfaces can limit shrinkage of the anode body at those locations where physical contact exists (sometimes referred to as "pinning") and thereby result in less shrinkage at the area of physical contact than other locations of the anode body. This shrinkage differential can, in turn, cause the anode body to bend and form a curved shape (e.g., crescent shape). To minimize such bending, sintering may be performed in such a manner that the surfaces of the anode body are not in physical contact with an external surface (e.g., surface of a sintering tray).

Figure 4:
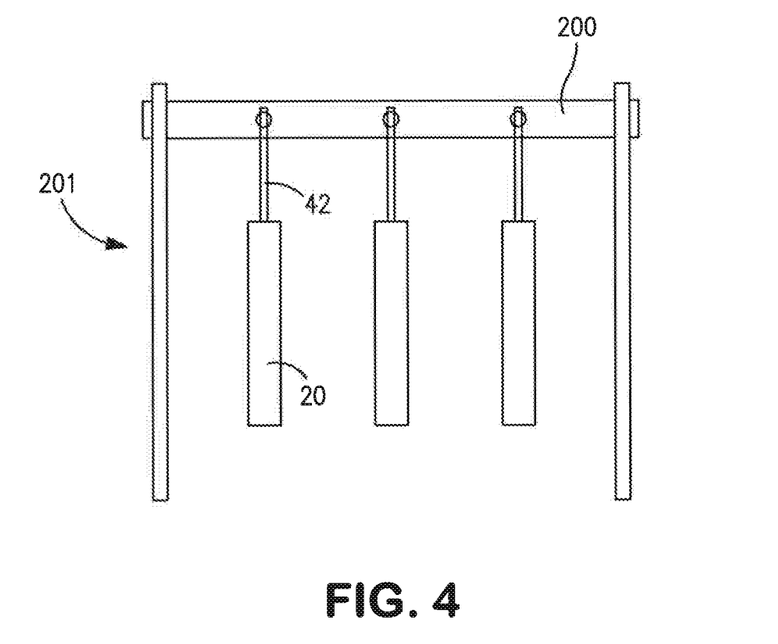
FIGS. 4-5 schematically illustrate one embodiment of a sintering method that may be employed in the present invention.
Figure 5:
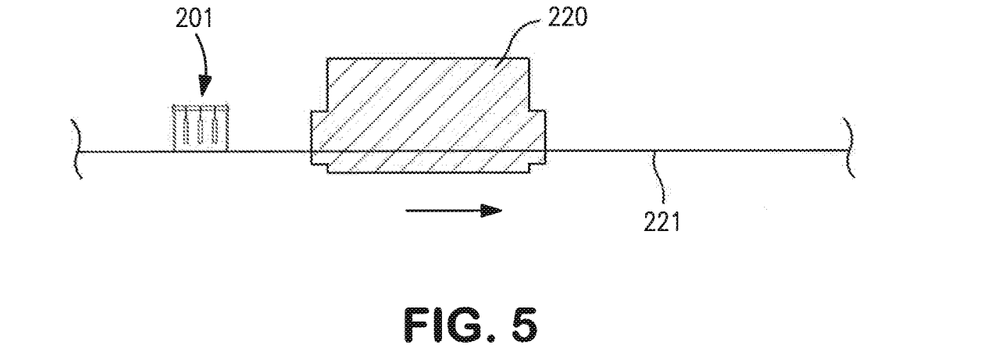

Referring to FIGS. 4-5, for example, one embodiment of such a sintering technique is shown in which one or more anodes 20 are connected to a stringer 200 via an anode lead 42. Any known method may be employed to attach the anode lead 42 to the stringer 200, such as welding, swaging, etc. In this manner, the anodes 20 are able to "hang" from the stringer 200 without physically contacting an external surface. The resulting anode assembly 201 may thus be positioned on a surface 221 that passes through a heat treatment device or furnace 220 (FIG. 5). As the anodes 20 are heated in the furnace 220, they are allowed to shrink freely without physical constraint. It should also be understood that various other configurations may be employed for sintering an anode without such constraint. In another embodiment, for instance, a hanging anode may be vertically displaced into a furnace and then lifted out of the device upon completion of the sintering process.

Figure 3:
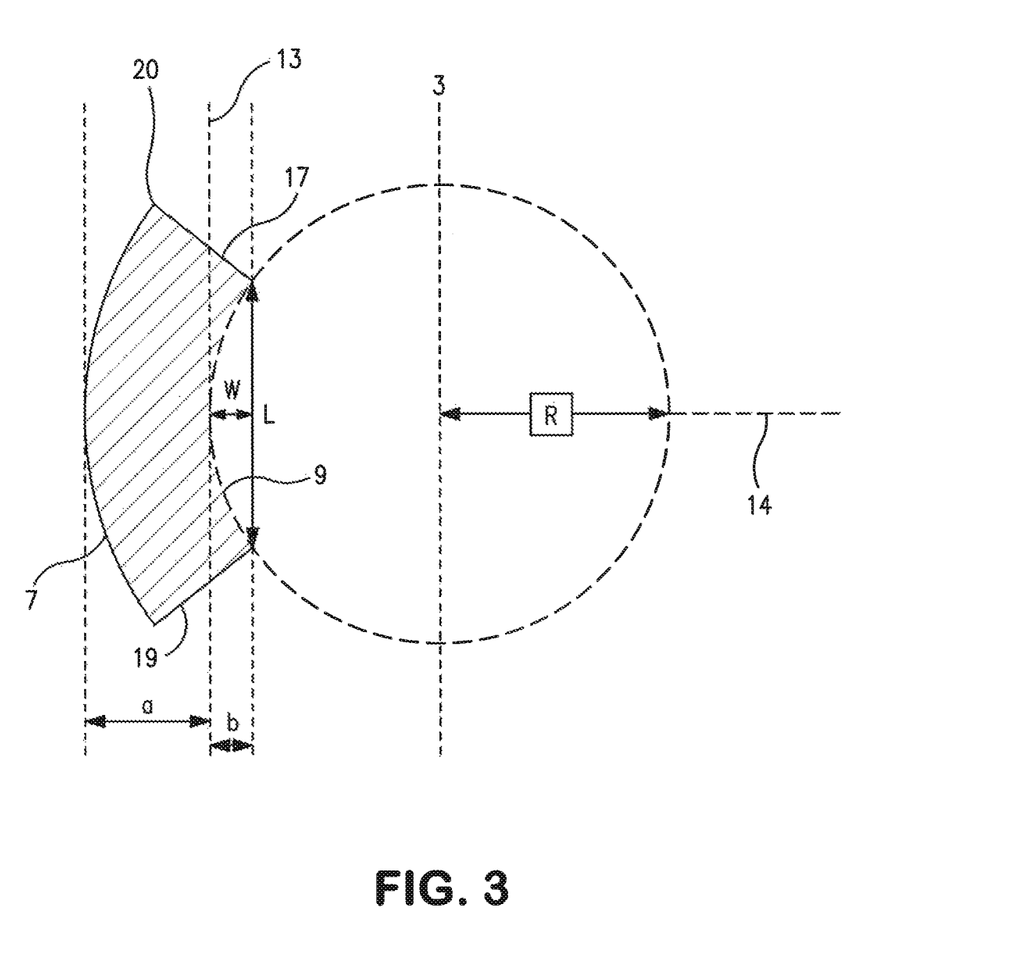
FIG. 3 is a cross-sectional view of a sintered anode body that may be employed in one embodiment of the present invention.

Despite its relatively large size, the resulting anode may thus remain dimensionally stable in that it possesses only a small degree of curvature, if any. The dimensional stability may be characterized by the orientation of the anode relative to a longitudinal medial plane that extends through an end of the anode. Referring to FIG. 3, for example, one embodiment of an anode 20 is shown that extends in the direction of a longitudinal axis 3. The anode 20 has an upper end portion 17 and lower end portion 19 between which extends a first edge portion 7 and an opposing second edge portion 9. A medial longitudinal plane 13 extends through the upper end portion 17 in a direction parallel to the longitudinal axis 3. Due to its dimensional stability, the anode 20 possesses only a small surface variance, if any, between the medial plane 13 and respective edge portions 7 and 9. That is, the difference "W" between the distance "a" (between the medial plane 13 and the edge portion 7) and the distance "b" (between the medial plane 13 and the edge portion 9), also known as "warp", is generally small along the length of the anode 20. For example, the difference W (or "warp") may be about 0.25 millimeters or less, in some embodiments about 0.20 millimeters or less, in some embodiments about 0.15 millimeters or less, and in some embodiments, from 0 to about 0.10 millimeters, along the length of the anode 20, such as at the center of the anode as shown in FIG. 3.

The radius of curvature, which is inversely proportional to the degree of curvature, may also be used to define the dimensionally stable anode 20. The radius of curvature may be specified in a direction that is representative of the general shape of the anode 20, such as in the direction of a medial transverse plane 14 that is perpendicular to the medial longitudinal plane 13. More particularly, the radius of curvature is represented by the designation "R" in FIG. 3, and may be calculated by the equation: Radius=$W/2+L^2/8W$, wherein W is the "warp" described above and L is the length. In certain embodiments, the radius of curvature in the direction of the medial transverse plane 14 may be about 25 centimeters or greater, in some embodiments about 50 centimeters or greater, and in some embodiments, about 100 centimeters or greater.

An anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

As indicated above, the anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

As indicated above, a solid electrolyte overlies the dielectric that generally functions as the cathode for the capacitor. The solid electrolyte may be formed from one or more conductive polymer layers. The conductive polymer(s) employed in such layers are typically π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxthiophene is available from H. C. Starck GmbH under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst may be a transition metal salt, such as a salt of an inorganic or organic acid that contain ammonium, sodium, gold, iron(III), copper(II), chromium(VI), cerium(IV), manganese(IV), manganese(VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

If desired, polymerization of the monomer may occur in a precursor solution. Solvents (e.g., polar protic or non-polar) may be employed in the solution, such as water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. When employed, the total amount of solvents in the precursor solution may be from about 40 wt. % wt. % to about 90 wt. %, in some embodiments from about 50 wt. % to about 85 wt. %, and in some embodiments, from about 60 wt. % to about 80 wt. %.

Polymerization of the thiophene monomer generally occurs at a temperature of from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

Upon polymerization, the resulting conductive polymer is generally in the form of particles having a small size, such as an average diameter of from about 1 to about 200 nanometers, in some embodiments from about 2 to about 100 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

If desired, the formation of the conductive polymer into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied by to the part using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed.

One benefit of employing such a dispersion is that it may be able to penetrate into the edge region of the capacitor body to increase the adhesion to the dielectric. This results in a more mechanically robust part, which may reduce equivalent series resistance and leakage current. Such dispersions may also minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage" (voltage at which the capacitor fails), such as about 60 volts or more, in some embodiments about 80 volts or more, in some embodiments about 100 volts or more, and in some embodiments, from about 120 volts to about 200 volts, as determined by increasing the applied voltage in increments of 3 volts until the leakage current reaches 1 mA.

If desired, the solid electrolyte may be formed from one or multiple layers. When multiple layers are employed, it is possible that one or more of the layers includes a conductive polymer formed by in situ polymerization. However, when it is desired to achieve very high breakdown voltages (e.g., from about 120 to 200 volts), the present inventors have discovered that the solid electrolyte is formed primarily from the polymeric dispersions described above, and that it is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

The solid electrolyte may optionally be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

The part may optionally be applied with one or more additional layers, such as an external coating that overlies the solid electrolyte. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

A protective coating may also be employed between the dielectric and the solid electrolyte. The protective coating may include a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1 \times 10^5$ Ω/cm, and in some embodiments, greater than about $1 \times 10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

Although not necessarily required, it is often desired that the capacitor element is generally free of resinous encapsulants (e.g., epoxy resin) often used in solid electrolytic capacitors. Among other things, such resinous materials can lead to a reduction in volumetric efficiency of the capacitor assembly.

II. Housing

The capacitor element of the present invention is enclosed and hermetically sealed within a housing. Hermetic sealing typically occurs in the presence of a gaseous atmosphere that contains at least one inert gas so as to inhibit oxidation of the solid electrolyte during use. The inert gas may include, for instance, nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. For example, the moisture content (expressed in terms of relatively humidity) may be about 10% or less, in some embodiments about 5% or less, in some embodiments about 1% or less, and in some embodiments, from about 0.01 to about 5%.

Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

Figure 1:
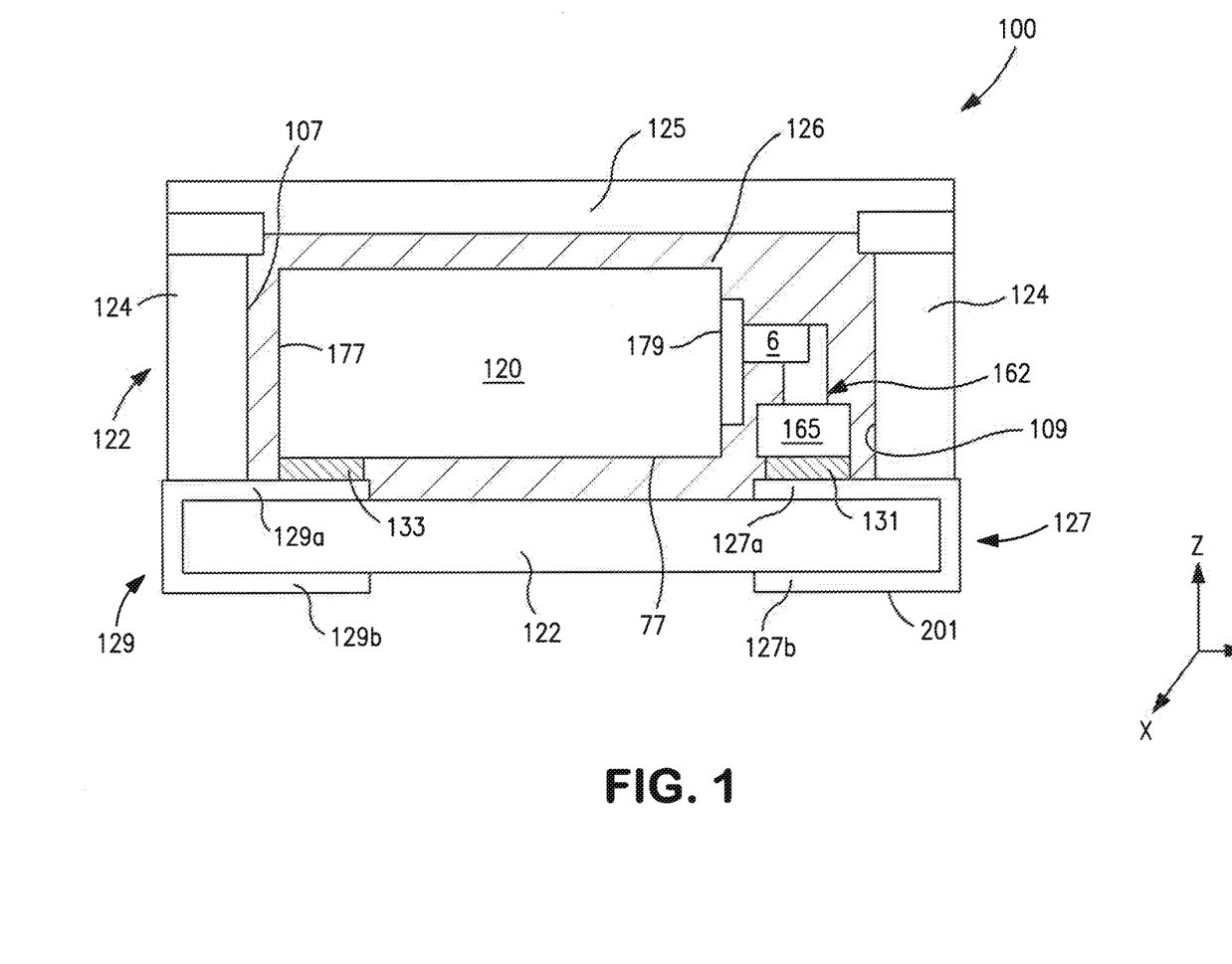
FIG. 1 is a cross-sectional view of one embodiment of a capacitor assembly of the assembly of the present invention.
Figure 2:
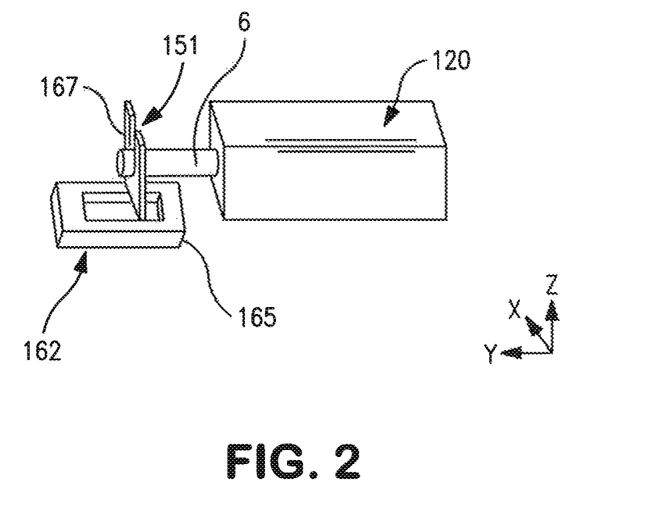
FIG. 2 is a perspective view of a leadframe in electrical connection with a capacitor in accordance with one embodiment of the present invention.

The housing may have any desired shape, such as cylindrical, D-shaped, rectangular, triangular, prismatic, etc. Referring to FIGS. 1-2, for example, one embodiment of a capacitor assembly 100 is shown that contains a housing 122 and a capacitor element 120. In this particular embodiment, the housing 122 is generally rectangular. Typically, the housing and the capacitor element have the same or similar shape so that the capacitor element can be readily accommodated within the interior space. In the illustrated embodiment, for example, both the capacitor element 120 and the housing 122 have a generally rectangular shape.

As indicated above, the capacitor assembly of the present invention may exhibit a relatively high volumetric efficiency. To facilitate such high efficiency, the capacitor element typically occupies a substantial portion of the volume of an interior space of the housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior space of the housing. To this end, the difference between the dimensions of the capacitor element and those of the interior space defined by the housing are typically relatively small.

Referring to FIGS. 1-2, for example, the capacitor element 120 of FIGS. 1-2 has a length that is defined between edge portions 177 and 179 (excluding the length of the anode lead 6). Likewise, the interior space 126 has a length that is defined between interior surfaces of first and second edge portions 107 and 109, respectively. Typically, the ratio of the length of the anode to the length of the interior space ranges from about 0.40 to 1.00, in some embodiments from about 0.50 to about 0.99, in some embodiments from about 0.60 to about 0.99, and in some embodiments, from about 0.70 to about 0.98. For example, the capacitor element 120 may have a length of from about 5 to about 10 millimeters, and the interior space 126 may have a length of from about 6 to about 15 millimeters. Similarly, the ratio of the height of the capacitor element 120 (in the −z direction) to the height of the interior space 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the −x direction) to the width of the interior space 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior space 126 may be from about 3 to about 10 millimeters, and the height of the capacitor element 120 may be from about 0.5 to about 2 millimeters and the width of the interior space 126 may be from about 0.7 to about 6 millimeters.

Generally, the capacitor element is attached to the housing in such a manner that an anode termination and cathode termination are formed external to the housing for subsequent integration into a circuit. The particular configuration of the terminations may depend on the intended application. In one embodiment, terminal pins may be employed that extend through opposing ends of the housing. Referring again to FIG. 1, for instance, one of the terminal pins (not shown) may be connected (e.g., welded) to the anode lead 6 so that it extends through a wall 124 of the housing, while another of the terminal pins (not shown) is connected to the cathode of the capacitor element 120 and extends through a wall 124.

While a terminal pin configuration may be useful in certain embodiments, the present inventors have discovered that the capacitor assembly may also be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor. The thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

In certain embodiments, connective members may be employed within the interior space of the housing to facilitate connection to the terminations in a mechanically stable manner. For example, referring again to FIGS. 1-2, the capacitor assembly 100 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a longitudinal direction in which the lead 6 extends (e.g., −y direction). The first portion 167 is "upstanding" in the sense that it is provided in a plane that is generally perpendicular the longitudinal direction in which the lead 6 extends. In this manner, the first portion 167 can limit movement of the lead 6 in the horizontal direction to enhance surface contact and mechanical stability during use.

The first portion 167 may also possess a mounting region 151 (see FIG. 2) that is connected to an anode lead 6. The region 151 may have a "U-shape" for further enhancing surface contact and mechanical stability of the lead 6. Connection of the region 151 to the lead 6 may be accomplished using any of a variety of known techniques, such as welding, laser welding, conductive adhesives, etc. In one particular embodiment, for example, the region 151 is laser welded to the anode lead 6. Regardless of the technique chosen, however, the first portion 167 can hold the anode lead 6 in substantial horizontal alignment to further enhance the dimensional stability of the capacitor assembly 100.

Referring again to FIG. 1, one embodiment of the present invention is shown in which the connective member 162 and capacitor element 120 are connected to the housing 122 through anode and cathode terminations 127 and 129, respectively. More specifically, the housing 122 includes a lower wall 122 and two opposing sidewalls 124 between which a cavity 126 is formed that includes the capacitor element 120. The lower wall 122 and sidewalls 124 may be formed from one or more layers of a metal, plastic, or ceramic material such as described above. In this particular embodiment, the anode termination 127 contains a first region 127*a* that is positioned within the housing 122 and electrically connected to the connection member 162 and a second region 127*b* that is positioned external to the housing 122 and provides a mounting surface 201. Likewise, the cathode termination 129 contains a first region 129*a* that is positioned within the housing 122 and electrically connected to the solid electrolyte of the capacitor element 120 and a second region 129*b* that is positioned external to the housing 122 and provides a mounting surface 203. It should be understood that the entire portion of such regions need not be positioned within or external to the housing.

Connection of the terminations 127 and 129 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Of course, other techniques may also be employed to connect the terminations. In alternative embodiments, for example, the terminations may be connected to the housing via conductive traces that extend through the housing. Any conductive material may be employed to form the traces, such as a conductive metal (e.g., copper, nickel, silver, zinc, tin, palladium, lead, copper, aluminum, molybdenum, titanium, iron, zirconium, tungsten, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The traces may be formed using any known technique, such as by printing or coating an ink containing the metal onto a surface of the housing. Various techniques for providing conductive traces in a housing are described in more detail in U.S. Pat. No. 5,314,606 to Irie, et al. and U.S. Pat. No. 7,304,832 to Ushio, et al., as well as U.S. Patent Application Publication No. 2005/0167789 to Zhuanq and 2007/0138606 to Brailey, all of which are incorporated herein in their entirety by reference thereto for all purposes.

Regardless of the manner in which the terminations are connected, the resulting package is hermetically sealed as described above. Referring to FIG. 1, for instance, the housing 122 may also include a lid 125 that is placed on an upper surface of the side walls 124 after the capacitor element 120 is positioned within the housing 122. The lid 125 may be formed from a ceramic, metal (e.g., iron, copper, nickel, cobalt, etc., as well as alloys thereof), plastic, and so forth. In one embodiment, for example, the lid contains a Kovar® alloy (Carpenter Technology Corporation), which is a nickel-cobalt ferrous alloy. The size of the housing 122 is generally such that the lid 125 does not contact any surface of the capacitor element 120 so that it is not contaminated. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Although not required, other layers and/or materials may also be employed in the housing 122. For example, one or more barrier members (not shown) may be formed on the lower wall 122, sidewall(s) 124, and/or lid 125 to inhibit damage to the capacitor element 120 during hermetic sealing of the assembly. The barrier member(s) may be formed from any materials known in the art, such as antireflection materials that are capable of preventing a laser beam from being reflected. Examples of such materials may include polymers, such as epoxy resins, polyimides, polyolefins (e.g., polyethylene or polypropylene), optionally containing filler particles (e.g., black pigment).

As a result of the present invention, the capacitor assembly may exhibit excellent electrical properties even when exposed to high temperature environments. For example, the capacitor assembly may have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F^*V$, in some embodiments less than about 0.5 $\mu A/\mu F^*V$, and in some embodiments, less than about 0.1 $\mu A/\mu F^*V$, where $\mu A$ is microamps and $uF^*V$ is the product of the capacitance and the rated voltage. Such ESR and normalized leakage current values may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about 100° C. to about 250° C., and, in some embodiments from about 100° C.

to about 225° C., and in some embodiments, from about 100° C. to about 225° C. (e.g., 100° C., 125° C., 150° C., 175° C., or 200° C.).

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at an operating frequency of 120 Hz and a temperature of 25° C. For example, the capacitor may exhibit an energy density of about 2.0 joules per cubic centimeter ($J/cm^3$) or more, in some embodiments about 3.0 $J/cm^3$, in some embodiments from about 4.0 $J/cm^3$ to about 10.0 $J/cm^3$, and in some embodiments, from about 4.5 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$.

The present invention may be better understood by reference to the following examples.

Test Procedures

Leakage Current:

Leakage current ("DCL") was measured using a leakage test set that measures leakage current at a temperature of 25° C. and at the rated voltage after a minimum of 20 seconds.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Example 1

A tantalum anode with a size of 5.2 mm (length)×3.7 mm (width)×0.85 mm (height) was anodized at 120V in a liquid electrolyte to 10 μF. A conductive polymer coating was then formed by dipping the anode into a dispersed poly(3,4-ethylenedioxythiophene) having a solids content 1.1% (Clevios™ K, H. C. Starck). Upon coating, the part was then dried at 125° C. for 20 minutes. This process was repeated 6 times. Thereafter, the part was dipped into a dispersed poly(3,4-ethylenedioxythiophene) having a solids content 2% and dried at 125° C. for 20 minutes. Once again, this process was repeated 6 times. External carbon and silver coats were formed for finishing the manufacturing process of the anodes.

A standard copper-based leadframe was used to finish the assembly process. One portion of the leadframe was attached to the lower surface of the capacitor element with a silver adhesive. The tantalum wire of the capacitor element was then laser welded to another portion of the leadframe.

Ceramic housings were also obtained Kyocera America, Inc. of San Diego, Calif. under the name "Cap Pak." The housing had an interior length of 9.0 mm, a width of 4.0 mm, and a height of 1.5 mm with gold plated solder pads on the bottom inside part of ceramic housing. The lead frame was first glued to a gold anode termination inside the container and thereafter the cathode portion of the capacitor was glued to a gold cathode termination. The adhesive employed for the terminations were silver-loaded epoxy adhesives). The resulting assembly was then heated in a convection oven preset at 150° C. for 60 minutes to cure the adhesive. After curing, a Kovar® metal lid having a length of 9.95 mm, a width of 4.95 mm, and a thickness of 0.10 mm was placed over the top of the container, closely on the seal ring of the ceramic housing (Kovar® ring having a thickness of 0.30 mm) so that there was no direct contact between the interior surface of the lid and the exterior surface of the attached capacitor. The resulting assembly was placed into a welding chamber and purged with nitrogen gas for 120 minutes before seam welding between seal ring and the lid was performed. No additional burn-in or healing was performed after the seam welding.

Example 2

A tantalum anode with a size of 1.8 mm×2.4 mm×1.2 mm was anodized at 16V in a liquid electrolyte to 150 μF. A conductive polymer coating was then formed by dipping the anode into a butanol solution of iron (III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 12 times. The parts were then coated by graphite and silver and assembled into a ceramic housing as described in Example 1.

For life testing purposes, the parts of Examples 1 and 2 were placed in an oven at 125° C. (with an applied voltage equal to the rated voltage) and at 200° C. (with an applied voltage equal to 50% of the rated voltage). Parts were also placed in an oven at 215° C. and 230° C. (without applied voltage). After 500 hours of each tests, the leakage current (DCL), equivalent series resistance (ESR), and capacitance of the parts were determined at room temperature (23° C.±2° C.) to verify whether the part had shown any degradation. The results are set forth below in Tables 1 and 2.

TABLE 1

Life Testing at 125° C. or 200° C. (Applied Voltage)

| | Conditions | | Before Testing | | | After Testing | | |
|---|---|---|---|---|---|---|---|---|
| Example | Temp [° C.] | Voltage | DCL [μA] | CAP [μF] | ESR [mΩ] | DCL [μA] | CAP [μF] | ESR [mΩ] |
| 1 | 125 | rated | 5.8 | 8.2 | 143 | 0.6 | 8.2 | 138 |
| | 200 | 50% of rated | 22.0 | 8.3 | 128 | 55.4 | 8.1 | 171 |
| 2 | 125 | rated | 11.8 | 138.0 | 172 | 82.9 | 134.4 | 268 |
| | 200 | 50% of rated | | | | N/A | | |

TABLE 2

Life Testing at 215° C. or 230° C. and No Applied Voltage

| | Conditions | | Before Testing | | | After Testing | | |
|---|---|---|---|---|---|---|---|---|
| Example | Temp [° C.] | Voltage | DCL [μA] | CAP [μF] | ESR [mΩ] | DCL [μA] | CAP [μF] | ESR [mΩ] |
| 1 | 215 | — | 1.8 | 8.5 | 367 | 1.8 | 9.0 | 383 |
| | 230 | — | 0.3 | 8.4 | 327 | 0.6 | 9.0 | 353 |

TABLE 2-continued

Life Testing at 215° C. or 230° C. and No Applied Voltage

| | Conditions | | Before Testing | | | After Testing | | |
|---|---|---|---|---|---|---|---|---|
| Example | Temp [° C.] | Voltage | DCL [µA] | CAP [µF] | ESR [mΩ] | DCL [µA] | CAP [µF] | ESR [mΩ] |
| 2 | 215 | — | 53.6 | 144.0 | 68 | 18.9 | 43.1 | 8000 |
|   | 230 | — | 14.5 | 144.0 | 83 | 8.3 | 10.6 | 156000 |

As indicated in both tables, and particularly in Table 2, the ESR and leakage current of the samples formed with a dispersion of PEDT particles (Example 1) was significantly lower after life testing then the samples formed with sequentially applied PEDT.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
a capacitor element comprising an anode formed from a sintered porous tantalum body and a dielectric, wherein a solid electrolyte overlies the anode that includes a layer in direct contact with the dielectric that is formed from poly(3,4-ethylenedioxythiophene) particles and a polymeric counterion, wherein the layer is generally free of poly(3,4-ethylenedioxythiophene) formed via in situ polymerization;
a housing that defines an interior space within which the capacitor element is positioned and hermetically sealed, wherein the housing comprises opposing first and second sidewalls and a lower wall, wherein the sidewalls include a metal, wherein the interior space has a gaseous atmosphere that contains an inert gas, wherein the inert gas includes nitrogen, helium, argon, xenon, neon, krypton, radon, or a combination thereof, and wherein inert gases constitute from about 50 wt. % to 100 wt. % of the gaseous atmosphere;
an anode termination that is in electrical connection with the anode body; and
a cathode termination that is in electrical connection with the solid electrolyte, wherein the capacitor assembly exhibits a breakdown voltage of about 60 volts or more.

2. The capacitor assembly of claim 1, wherein the counterion includes a polystyrene sulfonic acid.

3. The capacitor assembly of claim 1, wherein the ratio of the length of the anode to the length of the interior space is from about 0.40 to about 1.00.

4. The capacitor assembly of claim 1, wherein the ratio of the height of the anode to the height of the interior space is from about 0.40 to about 1.00.

5. The capacitor assembly of claim 1, wherein the ratio of the width of the anode to the width of the interior space is from about 0.80 to about 0.99.

6. The capacitor assembly of claim 1, wherein the housing and the anode have a generally rectangular shape.

7. The capacitor assembly of claim 1, wherein oxygen constitutes less than about 1 wt. % of the gaseous atmosphere.

8. The capacitor assembly of claim 1, wherein the anode and cathode terminations are surface mountable.

9. The capacitor assembly of claim 1, further comprising a lead that extends in a longitudinal direction from the porous body of the anode, wherein the lead is positioned within the interior space of the housing.

10. The capacitor assembly of claim 9, further comprising a connective member that contains a first portion that is positioned generally perpendicular to the longitudinal direction of the anode lead and connected thereto.

11. The capacitor assembly of claim 10, wherein the connective member further contains a second portion that is generally parallel to the longitudinal direction in which the anode lead extends.

12. The capacitor assembly of claim 11, wherein the second portion is positioned within the housing.

13. The capacitor assembly of claim 1, wherein the capacitor assembly exhibits a breakdown voltage of about 100 volts or more.

14. The capacitor assembly of claim 1, wherein the capacitor element is free of a resinous encapsulant.

15. The capacitor assembly of claim 1, wherein a first region of the anode termination is positioned within the housing and wherein a second region of the anode termination is positioned external to the housing.

16. The capacitor assembly of claim 1, wherein a first region of the cathode termination is positioned within the housing and wherein a second region of the cathode termination is positioned external to the housing.

17. The capacitor assembly of claim 1, wherein the particles have an average diameter of from about 4 nanometers to about 50 nanometers.

18. The capacitor assembly of claim 1, wherein the lower wall includes a metal.

19. The capacitor assembly of claim 1, wherein the housing further comprises a lid.

20. The capacitor assembly of claim 19, wherein the lid includes a metal.

* * * * *